(12) United States Patent
Ohgishi et al.

(10) Patent No.: US 10,827,109 B2
(45) Date of Patent: Nov. 3, 2020

(54) IMAGING APPARATUS (71) Applicant: Panasonic Intellectual Property Management Co., Ltd., Osaka (JP)

(72) Inventors: Kiyoshi Ohgishi, Kyoto (JP); Yutaka Shirai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 7 days.

(21) Appl. No.: 16/172,743

(22) Filed: Oct. 27, 2018

(65) Prior Publication Data
US 2019/0132505 A1 May 2, 2019

(30) Foreign Application Priority Data

Oct. 30, 2017 (JP) .................... 2017-208790

(51) Int. Cl.
*H04N 5/232* (2006.01)
*H04M 1/725* (2006.01)
(Continued)

(52) U.S. Cl.
CPC ....... *H04N 5/23206* (2013.01); *H04L 67/125* (2013.01); *H04M 1/00* (2013.01);
(Continued)

(58) Field of Classification Search
CPC .......... H04N 1/00127; H04N 1/00307; H04N 5/23203; H04N 5/23206; H04N 5/23241; H04N 5/232411; H04N 5/23245; H04N 2201/0039; H04N 2201/0075; H04M 1/7253; H04M 1/72533; H04W 76/14; H04W 76/15; H04W 76/19; H04W 88/06
See application file for complete search history.

(56) References Cited

U.S. PATENT DOCUMENTS 10,397,870 B2 * 8/2019 Shimosato ............... G08B 1/08
2004/0003307 A1 1/2004 Tsuji
(Continued)

FOREIGN PATENT DOCUMENTS

| JP | 2004-038295 A | 2/2004 |
| JP | 2015-122645 A | 7/2015 |
| JP | 2016-174220 | 9/2016 |

*Primary Examiner* — Daniel M Pasiewicz
(74) *Attorney, Agent, or Firm* — Renner, Otto, Boisselle & Sklar, LLP (57) ABSTRACT

An imaging apparatus includes a first communicator, a second communicator, a setter, and a controller. The first communicator performs first communication with an external device. The second communicator performs second communication with the external device. The setter sets a first function or a second function as a function when remotely activated from the external device. The first function includes a function of transmitting image data to the external device via the first communicator and receiving an operation signal for remote control from the external device. The second function includes a function of receiving the operation signal from the external device via the second communicator. The controller establishes a first connection of the first communication when remotely activated from the external device in a case where the first function is set. The controller establishes a second connection of the second communication after the first connection.

8 Claims, 9 Drawing Sheets

(51) Int. Cl.
*H04M 1/00* (2006.01)
*H04L 29/08* (2006.01)
*H04W 88/06* (2009.01)
*H04W 76/00* (2018.01)
*H04N 1/00* (2006.01)
*H04W 76/15* (2018.01)
*H04W 4/80* (2018.01)

(52) U.S. Cl.
CPC ...... *H04M 1/7253* (2013.01); *H04N 1/00127* (2013.01); *H04N 1/00307* (2013.01); *H04N 5/23245* (2013.01); *H04N 5/232411* (2018.08); *H04W 76/00* (2013.01); *H04W 76/15* (2018.02); *H04W 88/06* (2013.01); *H04N 2201/006* (2013.01); *H04N 2201/0039* (2013.01); *H04N 2201/0075* (2013.01); *H04N 2201/0084* (2013.01); *H04W 4/80* (2018.02)

(56) References Cited

U.S. PATENT DOCUMENTS

| | | |
|---|---|---|
| 2015/0181515 A1 | 6/2015 | Onohara |
| 2015/0245298 A1* | 8/2015 | Takahashi ......... H04W 52/0254 455/574 |
| 2017/0142318 A1* | 5/2017 | Tanaka ............... H04N 5/23245 |
| 2017/0310896 A1* | 10/2017 | Harada .............. H04N 5/23245 |
| 2017/0318165 A1 | 11/2017 | Ogata |

* cited by examiner

IMAGING APPARATUS

BACKGROUND

1. Technical Field

The present disclosure relates to an imaging apparatus that can be remote-controlled from another apparatus via communication.

2. Related Art

Japanese Unexamined Patent Application Publication No. 2016-174220 discloses communication apparatuses (for example, imaging apparatuses) that transmit image data for live view display to other communication apparatuses (for example, smartphones) and receive a control command from other communication apparatuses. The communication apparatuses in Japanese Unexamined Patent Application Publication No. 2016-174220 includes a communication unit that communicates with other communication apparatuses by using a plurality of communication paths, a communication function allocation unit that allocates a communication function to each communication path in the communication unit, and a display control unit that causes a display unit to display a communication state of the communication unit so as to be viewable. With such a configuration, it is possible to easily allocate a communication path for each function.

SUMMARY

According to a first aspect of the present disclosure, an imaging apparatus includes a first communicator, a second communicator, a setter, and a controller. The first communicator performs first communication with an external device. The external device remote-controls the imaging apparatus. The second communicator performs second communication with the external device. The setter sets at least a first function or a second function as a function to be executed when remotely activated from the external device. The first function includes a function of transmitting image data to the external device via the first communicator and receiving an operation signal for remote control from the external device. The second function includes a function of receiving the operation signal from the external device via the second communicator. The controller controls an operation of the imaging apparatus according to the function set. The controller establishes a first connection of the first communication when remotely activated from the external device in a case where the first function is set. The controller establishes a second connection of the second communication after the first connection.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, embodiments will be described in detail with reference to the drawings as appropriate. However, unnecessarily detailed descriptions may be omitted. For example, detailed descriptions of already well-known matters or redundant descriptions of substantially the same configuration may be omitted. This is intended to avoid making the following description unnecessarily redundant and to facilitate understanding by those skilled in the art. In addition, the inventor(s) provide the accompanying drawings and the following description in order to enable those skilled in the art to sufficiently understand the present disclosure and the subject matter described in claims is not intended to be thereby limited.

First Embodiment

1-1. Configuration

Figure 1:
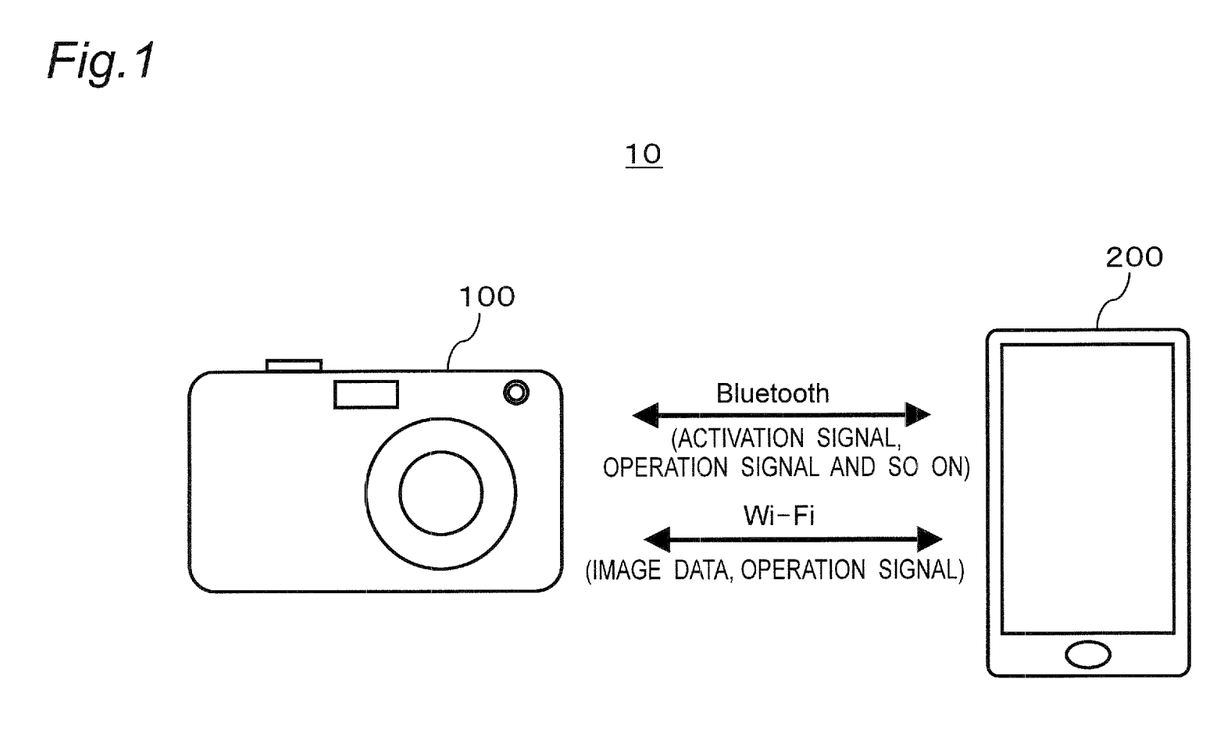
FIG. 1 is a schematic diagram of an imaging system including a digital camera and a smartphone.

FIG. 1 is a diagram showing a configuration of an imaging system according to a first embodiment of the present disclosure. An imaging system 10 includes a digital camera 100 (an example of an imaging apparatus) and a smartphone 200 (an example of an external device).

The digital camera 100 and the smartphone 200 can communicate with each other conforming to the Wi-Fi (registered trademark) standard and the Bluetooth (registered trademark) standard. Using the communication between the digital camera 100 and the smartphone 200, for example, the digital camera 100 can transfer the image being photographed to the smartphone 200 in real time to make a live view display on the smartphone 200. Here, the live view is a function of displaying an image (moving image) captured by the digital camera 100 on the smartphone 200 in real time. The user can check the situation of a subject by referring to the image displayed in live view and can determine the composition of a photographed image. In addition, the smartphone 200 can transmit an operation signal for remote control of the digital camera 100 to the digital camera 100. That is, the digital camera 100 can be remote-controlled from the smartphone 200.

Figure 2:
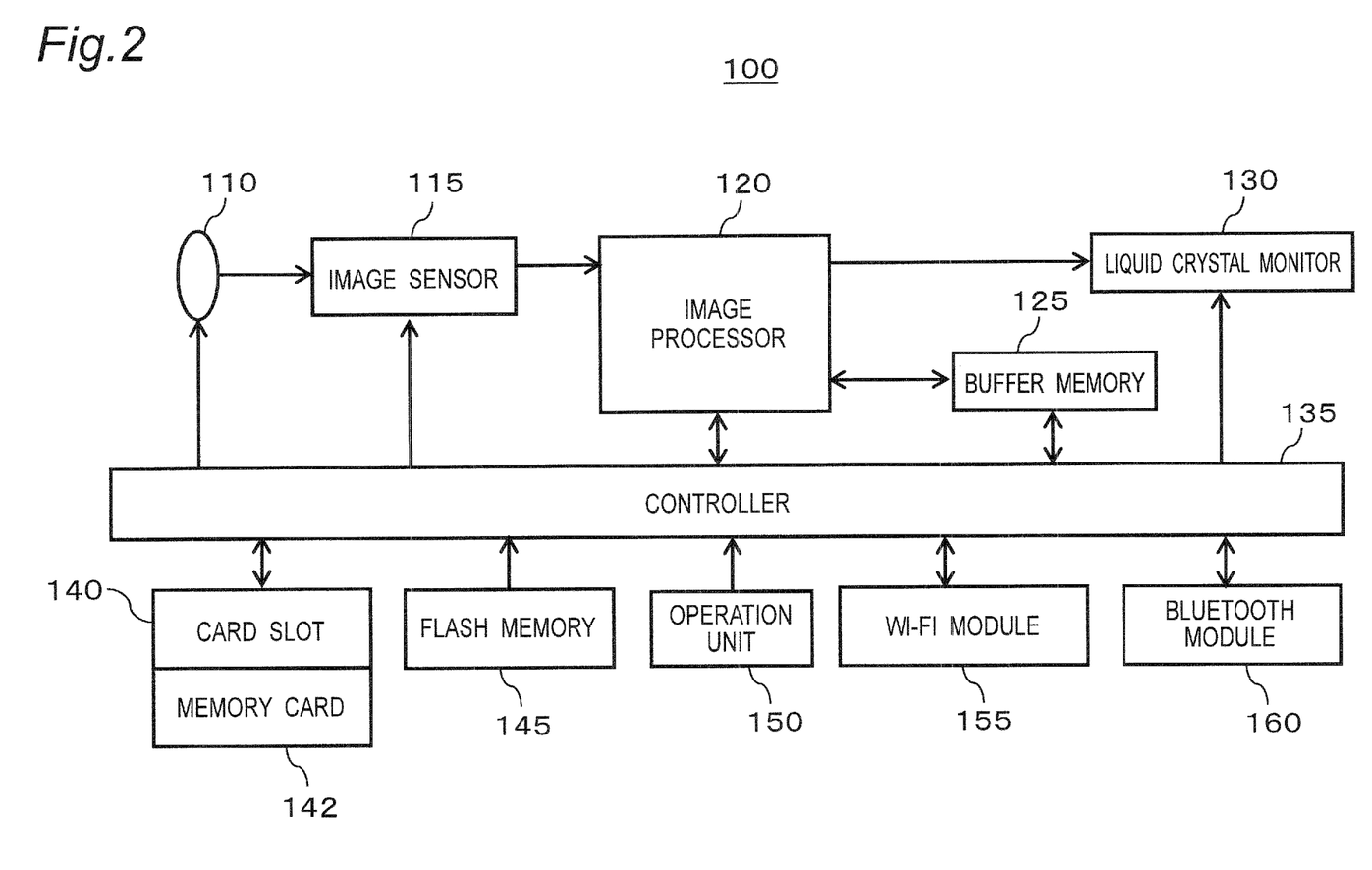
FIG. 2 is an electrical block diagram of the digital camera.

FIG. 2 is an electrical block diagram of the digital camera 100. The digital camera 100 captures a subject image formed via an optical system 110 with an image sensor 115. The image sensor 115 generates image data (RAW data) based on the captured subject image. An image processor 120 performs various kinds of processing on the image data generated by imaging. A controller 135 records the image data processed by the image processor 120 in a memory card 142. In addition, the controller 135 can cause a liquid crystal monitor 130 to display (reproduce) the image data recorded in the memory card 142 according to the operation of an operation unit 150 by the user. Each component constituting the digital camera 100 will be described below.

The optical system 110 includes a focus lens, a zoom lens, an optical image stabilizer (OIS) lens, a diaphragm, a shutter and the like. Various lenses included in the optical system 110 may include any number of lenses or may include any number of groups.

The image sensor 115 captures a subject image formed via the optical system 110 to generate image data. The image sensor 115 generates image data of a new frame at a predetermined frame rate (for example, 30 frames/s). The generation timing of imaging data and an electronic shutter operation in the image sensor 115 are controlled by the controller 135. Various types of image sensors such as a CMOS image sensor, a CCD image sensor, or an NMOS image sensor can be used as the image sensor.

The image processor 120 performs various kinds of processing on the image data output from the image sensor 115 and then records the processed data in the memory card 142. Further, the image processor 120 performs various kinds of processing on the image data read from the memory card 142 to generate an image to be displayed on the liquid crystal monitor 130. Examples of various kinds of processing include white balance corrections, gamma corrections, YC conversion processing, electronic zoom processing, compression processing, decompression processing and the like, but are not limited thereto. The image processor 120 may be configured with a hardwired electronic circuit or may be configured with a microcomputer using a program or the like.

The liquid crystal monitor 130 is provided on the back side of the digital camera 100. The liquid crystal monitor 130 displays an image based on the image data processed by the image processor 120. Instead of the liquid crystal monitor, another monitor such as an organic EL monitor may be used.

The controller 135 includes a CPU and performs centralized control of an operation of the entire digital camera 100. Further, the controller 135 may be configured with one semiconductor chip together with the image processor 120 or the like. Although not shown, the controller 135 contains a ROM. The ROM stores, for example, a service set identifier (SSID), a wired equivalent privacy key (WEP key) and the like necessary for establishing Wi-Fi communication with another communication apparatus (for example, the smartphone 200). The controller 135 can read the SSID and the WEP key from the ROM as necessary. In addition to programs related to autofocus control (AF control) and communication control performed by the CPU, programs for performing centralized control of operations of the entire digital camera 100 are stored in the ROM. Further, the controller 135 contains a RAM functioning as a working area of the CPU.

A buffer memory 125 is a recording medium that functions as a work memory of the image processor 120 and the controller 135. The buffer memory 125 is implemented by dynamic random access memory (DRAM) or the like.

A card slot 140 is a unit for connecting the memory card 142 to the digital camera 100. The card slot 140 is capable of electrically and mechanically connecting the memory card 142. The memory card 142 is an external recording medium having a recording element such as a flash memory therein. The memory card 142 can store data such as image data generated by the image processor 120.

The flash memory 145 is a nonvolatile recording medium. The operation unit 150 is a general term for hard keys such as operation buttons and operation levers provided on the exterior of the digital camera 100 and accepts operations by the user. The operation unit 150 includes, for example, a release button and a mode dial. The operation unit 150 also includes a touch panel superimposed on the liquid crystal monitor 130. Upon receiving an operation by the user, the operation unit 150 transmits an operation signal corresponding to the user operation to the controller 135.

A Wi-Fi module 155 is a communication module (circuit) that performs communication conforming to the communication standard IEEE 802.11 or the Wi-Fi standard. The digital camera 100 can communicate with other devices equipped with a Wi-Fi module via the Wi-Fi module 155. The digital camera 100 may directly communicate with other devices via the Wi-Fi module 155, or may communicate via an access point. Note that instead of the Wi-Fi module, a communication module that performs communication conforming to another communication standard may be used. That is, as a communication module, it is possible to use a communication module capable of communication having a relatively high communication bit rate and a communication area of several meters or more.

A Bluetooth module 160 is a module (circuit) for performing communication conforming to the Bluetooth Low Energy (BLE) standard. The digital camera 100 can perform communication conforming to the BLE standard with other devices via the Bluetooth module 160.

Figure 3:
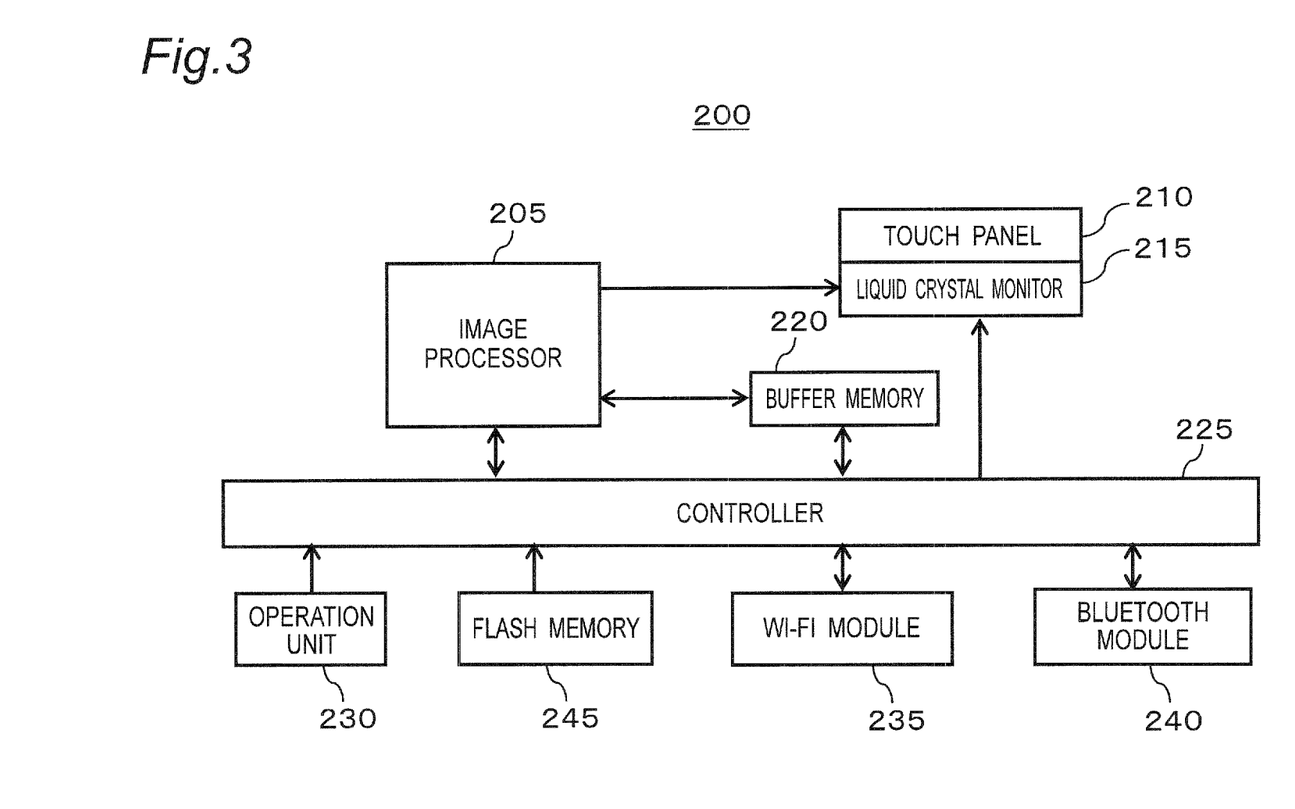
FIG. 3 is an electrical block diagram of the smartphone.

FIG. 3 is an electrical block diagram of the smartphone 200. The smartphone 200 can display an image indicated by image data generated by an image processor 205 on an liquid crystal monitor 215. A touch panel 210 is disposed on the surface of the liquid crystal monitor 215 so that a touch operation by the user can be accepted. In addition, the smartphone 200 has an operation unit 230 and can perform operations other than the operation by the touch panel 210 on the operation unit 230. A controller 225 can communicate with other devices via a Wi-Fi module 235 or a Bluetooth module 240.

The image processor 205 performs various kinds of processing on the image data read from a flash memory 245 to generate an image to be displayed on the liquid crystal monitor 215. Examples of various kinds of processing include decompression processing and the like, but are not limited thereto. The image processor 205 may be constituted as a hardwired electronic circuit or as a microcomputer using a program or the like.

The touch panel 210 is an input device that detects contact of a user's finger or the like and outputs operation information to the controller 225. The touch panel 210 is disposed on the surface of the liquid crystal monitor 215. The touch panel 210 may be a resistive film type, a capacitive type, or another type.

The liquid crystal monitor 215 is a display device that displays a screen instructed by the controller 225. Instead of the liquid crystal monitor, an organic EL monitor may be used.

A buffer memory 220 is a memory for temporarily storing information necessary for the controller 225 to perform various processing operations.

The controller 225 controls the operation of each unit constituting the smartphone 200. The controller 225 is electrically connected to the image processor 205, the touch panel 210, the liquid crystal monitor 215, the buffer memory 220, the operation unit 230, the Wi-Fi module 235, and the Bluetooth module 240.

The Wi-Fi module 235 is a communication module that performs communication conforming to the communication standard IEEE 802.11. The smartphone 200 can communicate with another device equipped with a Wi-Fi module via the Wi-Fi module 235. The smartphone 200 may directly communicate with other devices via the Wi-Fi module 235, or may communicate via an access point.

The Bluetooth module 240 is a module (circuit) that performs communication conforming to the Bluetooth Low Energy (BLE) standard. The smartphone 200 can perform communication conforming to the Bluetooth standard with other devices via the Bluetooth module 240.

The flash memory 245 stores image data photographed by the smartphone 200, image data transferred from the digital camera 100 and the like. The flash memory 245 stores a camera cooperative application executed by the controller 225 to implement a function to be described below. With the camera cooperative application, it is possible to receive image data from the digital camera 100 to make a live view display or to remote-control the digital camera 100.

The smartphone 200 further includes a telephone function, an Internet communication function, a camera function and the like.

1-2. Operation

Hereinafter, the operation related to the communication connection during remote activation in the digital camera 100 and the smartphone 200 will be described.

The digital camera 100 and the smartphone 200 can communicate with each other via Wi-Fi communication or Bluetooth communication.

When the communication connection between the digital camera 100 and the smartphone 200 is established, the digital camera 100 can receive time synchronization information, a GPS position signal, and an operation signal for remote shutter operation (hereinafter, referred to as a "shutter operation signal") from the smartphone 200 via the Bluetooth communication. Also, the digital camera 100 can receive an operation signal related to remote control from the smartphone 200 via Wi-Fi communication. In addition, the digital camera 100 can transmit image data indicating an image captured by the image sensor 115 to the smartphone 200 in real time via the Wi-Fi communication. At this point, the smartphone 200 can make a live view display based on the image data received from the digital camera 100.

Even when the digital camera 100, that is, the controller 135 is in a sleep state (hereinafter, referred to as a "power-off state"), minute electric power is supplied to the Bluetooth module 160 according to the BLE standard. Therefore, even when the digital camera 100 is in a power-off state, the Bluetooth module 160 can receive an activation signal to activate the digital camera 100 from the smartphone 200. Upon receiving the activation signal, the Bluetooth module 160 activates the controller 135 of the digital camera 100. That is, the smartphone 200 can remotely activate the digital camera 100.

The digital camera 100 according to the present embodiment has two modes of "remote control/live view mode" and "shutter remote control mode" as activation modes when remotely activated.

The remote control/live view mode is a mode that enables the live view display in the smartphone 200 and remote control of the digital camera 100 from the smartphone 200. The remote control/live view mode is implemented by a sequence shown in FIG. 6 to be described below. In the remote control/live view mode, the digital camera 100 preferentially connects the wireless LAN communication with the smartphone 200.

The shutter remote control mode is a mode that enables remote control of the shutter of the digital camera 100 from the smartphone 200. The shutter remote control mode is implemented by a sequence shown in FIG. 8 to be described below. In the shutter remote control mode, image data is not transferred from the digital camera 100 to the smartphone 200, and the smartphone 200 does not make the live view display. In the shutter remote control mode, the digital camera 100 preferentially connects the Bluetooth communication with the smartphone 200.

During remote activation, it is possible to set in the digital camera 100 the activation mode either of the remote control/live view mode or the shutter remote control mode in order to activate the digital camera 100 in the active mode.

Figure 4:
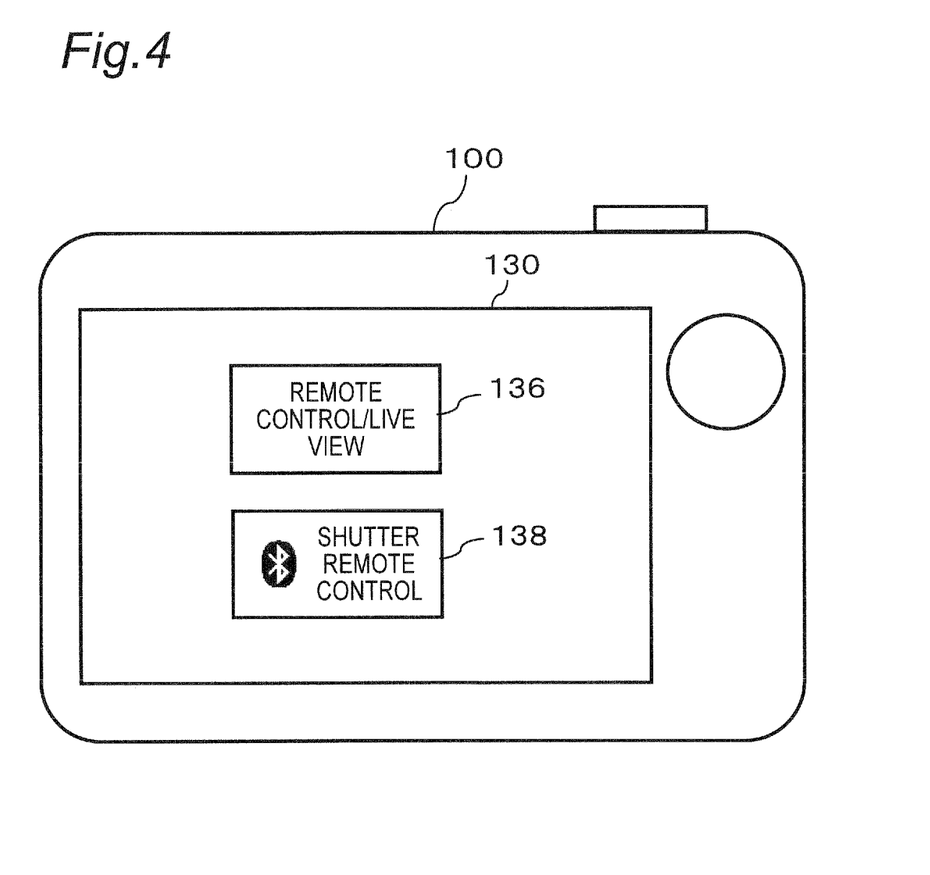
FIG. 4 is a diagram illustrating icons for setting an activation mode during remote control displayed on the digital camera.

FIG. 4 shows a setting screen displayed on the liquid crystal monitor 130 of the digital camera 100 to make such settings. As shown in FIG. 4, the setting screen includes two icons 136, 138. The icon 136 is an icon to set the digital camera 100 to the remote control/live view mode. The icon 138 is an icon to set the digital camera 100 to the shutter remote control mode. When one of the icons 136, 138 is selected by the user, the digital camera 100 is set to the remote control/live view mode or the shutter remote control mode.

Figure 5:
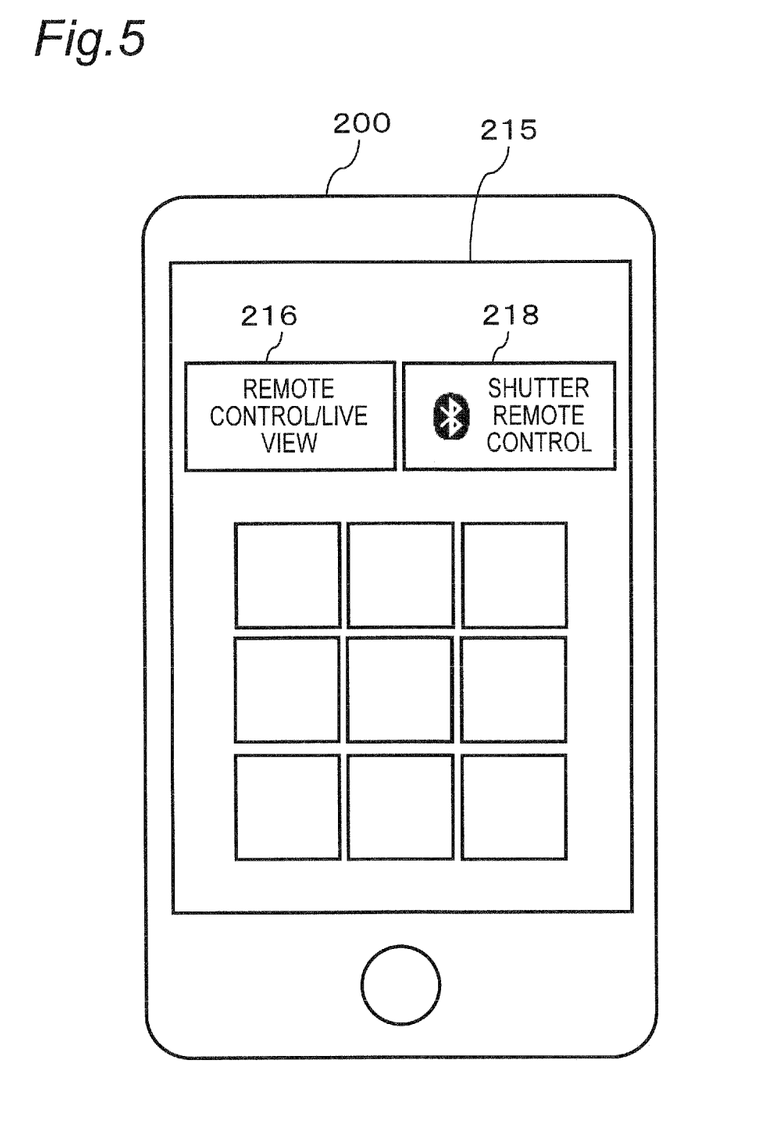
FIG. 5 is a diagram illustrating icons for instructing remote activation displayed on the smartphone.

FIG. 5 is a diagram illustrating an icon displayed on the liquid crystal monitor 215 of the smartphone 200 to instruct remote activation of the digital camera 100. The screen shown in FIG. 5 is displayed by the function of the camera cooperative application installed in the smartphone 200. An icon 216 is an icon selected by the user when the user desires to activate the digital camera 100 in the remote control/live view mode. The icon 218 is an icon selected by the user when the user desires to activate the digital camera 100 in the shutter remote control mode. When the user selects the icon 216, the smartphone 200 operates in the sequence shown in FIG. 6 to be described below. When the user selects the icon 218, the smartphone 200 operates in the sequence shown in FIG. 8 to be described below.

As shown in FIGS. 4 and 5, the digital camera 100 and the smartphone 200 have the same designs of icons for the respective modes. This improves the convenience during operation by the user.

Hereinafter, the operation related to the communication connection between the digital camera 100 and the smartphone 200 in the remote control/live view mode will be described with reference to FIG. 6. In the following description, it is assumed that the digital camera 100 and the smartphone 200 are paired in advance according to the Bluetooth standard. Pairing is processing of authenticating each other as a communication partner so as not to communicate with unrelated devices. Further, it is assumed that the digital camera 100 is set to the remote control/live view mode in advance.

When the user selects the icon 216 for the remote control/live view mode displayed on the smartphone 200 when the digital camera 100 is in the power-off state, the controller 225 of the smartphone 200 transmits an activation signal to the digital camera 100 via the Bluetooth module 240 as an activation request (S1).

Upon receiving the activation signal from the smartphone 200, the Bluetooth module 160 of the digital camera 100 activates the controller 135 (S2). Accordingly, the controller 135 returns from the power-off state and controls the entire digital camera 100 into an operable state.

When the controller 135 is activated, the controller 135 initializes various drivers in common between the digital camera 100 and the smartphone 200 (S3). At this point, various common drivers are also initialized on the smartphone 200.

When the initialization of common drivers is completed, the controller 135 first establishes a wireless LAN connection (that is, a Wi-Fi connection) with the smartphone 200 via the Wi-Fi module 155 in the remote control/live view mode (S4). Thus, the controller 135 performs initialization for Wi-Fi connection and establishes a wireless LAN connection (that is, a Wi-Fi connection) between the digital camera 100 and the smartphone 200 (S5).

Next, the controller 135 establishes a digital living network alliance (DLNA) (registered trademark) connection between the digital camera 100 and the smartphone 200 (S6). When the DLNA connection is established, a communication path for exchanging commands and data is established between the digital camera 100 and the smartphone 200. The digital camera 100 can transfer image data for live view to the smartphone 200 via the communication path. The smartphone 200 can perform a live view function using the image data received from the digital camera 100. Image transfer is implemented by a predetermined application.

When the DLNA connection is established, the controller 135 makes a Bluetooth connection with the smartphone 200 (S7). Thus, the controller 135 initializes the Bluetooth communication function and establishes the Bluetooth connection (S8). When the Bluetooth connection is established, the smartphone 200 can transmit the time synchronization information, the GPS position information, and the operation signal for remote control to the digital camera 100 via the Bluetooth communication.

Therefore, in the present embodiment, a wireless LAN connection (Wi-Fi connection) is established before the Bluetooth connection in the remote control/live view mode. The reason therefor will be described below.

Figure 7:
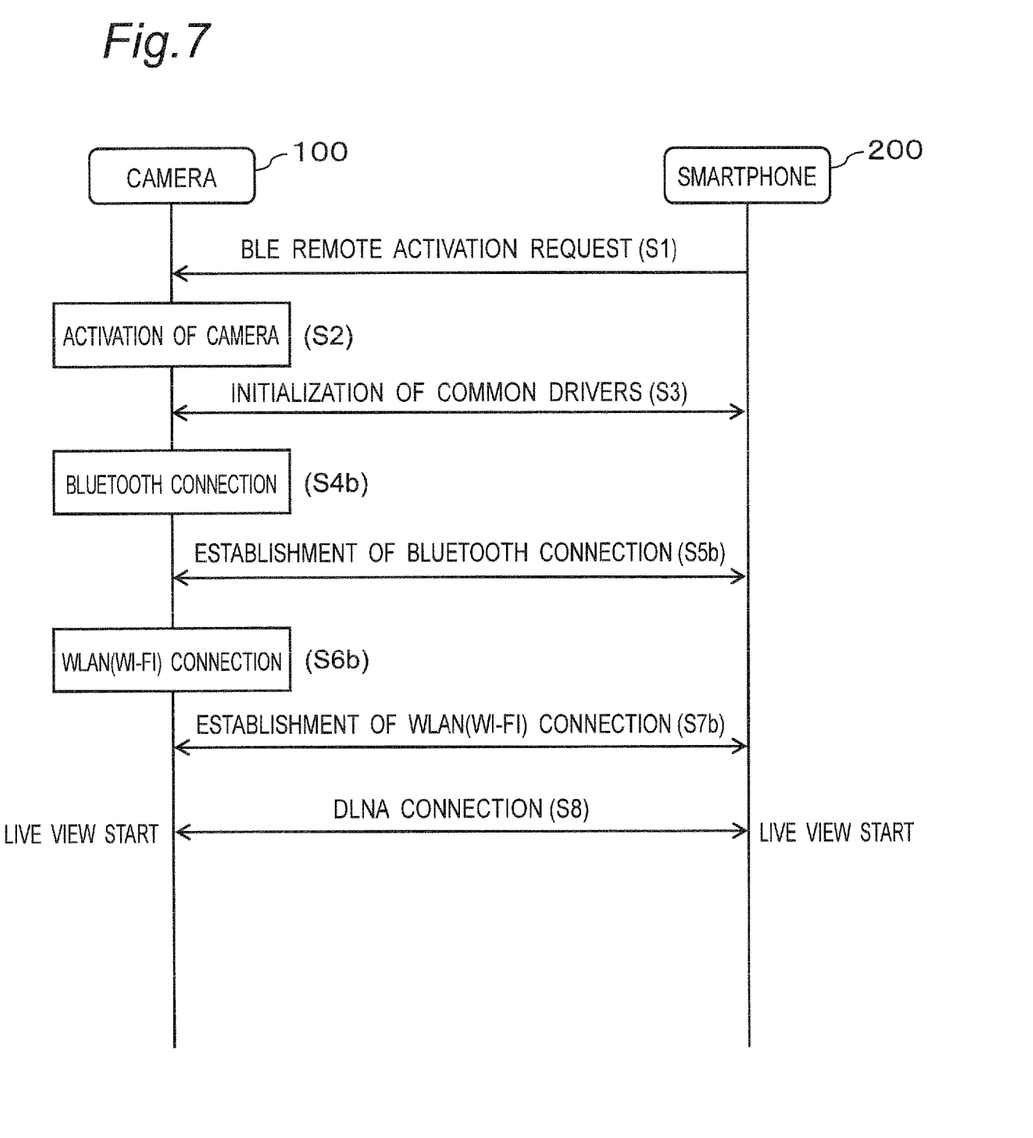
FIG. 7 is a diagram showing an operation sequence as a sequence between the digital camera and the smartphone when a Bluetooth connection is established before a Wi-Fi connection.

FIG. 7 is a diagram showing a sequence in the case of establishing a Bluetooth connection before a wireless LAN connection (Wi-Fi connection). Generally, it takes time (for example, 20 seconds) to establish a Bluetooth connection. Therefore, as shown in FIG. 7, when a Bluetooth connection is first made (S4b, S5b) and then a wireless LAN connection is made (S6b, S7b), it takes time to establish the intermediate Bluetooth connection and thus, it takes time from the activation of the digital camera 100 to the completion of the wireless LAN connection. The live view function in the smartphone 200 needs to establish a wireless LAN connection. Therefore, if it takes time from the activation of the digital camera 100 to the completion of wireless LAN connection, there arises a problem that it takes time before starting the live view.

Figure 6:
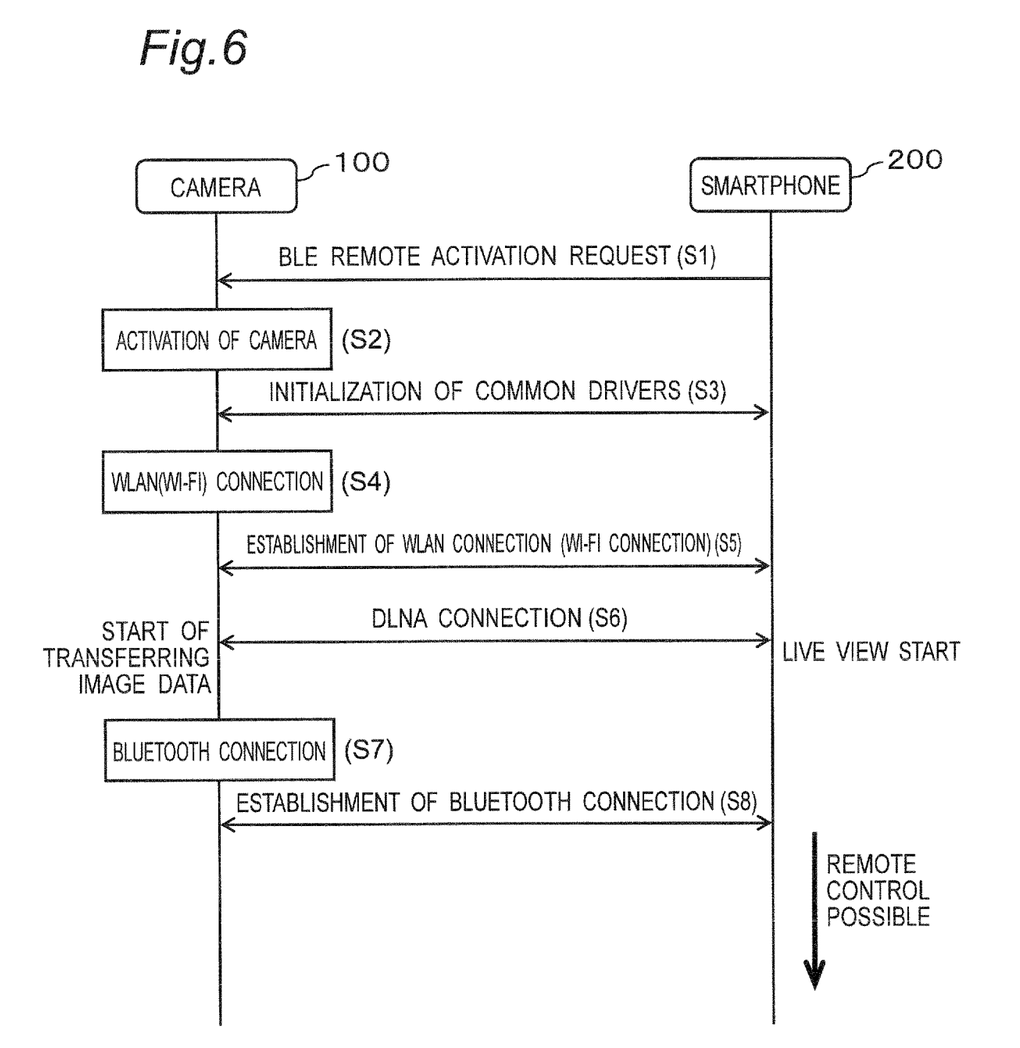
FIG. 6 is a diagram showing an operation sequence between the digital camera and the smartphone in a remote control/live view mode.

In order to solve the above problem, as shown in FIG. 6, the wireless LAN connection is established prior to the Bluetooth connection in the present embodiment and thus, as compared with the case shown in FIG. 7, the time needed before the wireless LAN connection is established between the digital camera 100 and the smartphone 200 can be shortened by the time needed for the Bluetooth connection. Therefore, the live view function can be implemented at an earlier stage from the activation of the digital camera 100.

Figure 8:
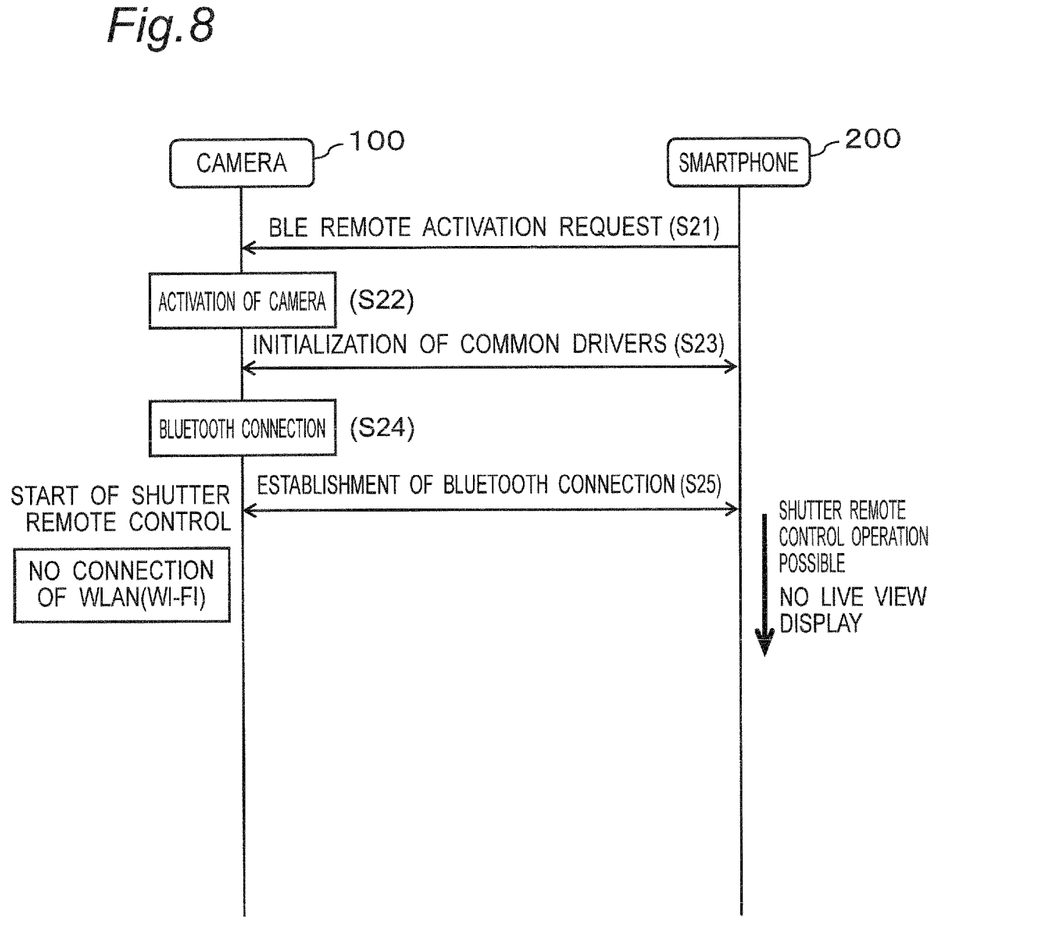
FIG. 8 is a diagram showing an operation sequence between the digital camera and the smartphone in a shutter remote control mode.

FIG. 8 is a diagram showing an operation sequence of the digital camera 100 and the smartphone 200 when activated in the shutter remote control mode. The operation related to the communication connection between the digital camera 100 and the smartphone 200 in the shutter remote control mode will be described below. In the following description, it is assumed that the digital camera 100 is set to the shutter remote control mode.

When the user selects the icon 218 for shutter remote control mode displayed on the smartphone 200 when the digital camera 100 is in the power-off state, the controller 225 of the smartphone 200 transmits an activation signal to the digital camera 100 via the Bluetooth module 240 as an activation request (S21).

Upon receiving the activation signal from the smartphone 200, the Bluetooth module 160 of the digital camera 100 activates the controller 135 (S22). Accordingly, the controller 135 returns from the power-off state and controls the entire digital camera 100 into an operable state.

Then, the controller 135 initializes various drivers in common between the digital camera 100 and the smartphone 200 (S23). Various common drivers are also initialized on the smartphone 200.

When the initialization of common drivers is completed, the controller 135 makes a Bluetooth connection with the smartphone 200 in the shutter remote control mode (S24). That is, the controller 135 performs initialization of the Bluetooth connection and then establishes a Bluetooth connection (S25). Then, the smartphone 200 can transmit a shutter operation signal to the digital camera 100 and the digital camera 100 can receive a shutter operation signal from the smartphone 200 via the Bluetooth communication.

At this point, the wireless LAN communication between the digital camera 100 and the smartphone 200 is not automatically established. The digital camera 100 does not transfer image data to the smartphone 200 and the smartphone 200 does not make the live view display. Note that after the completion of operation shown in FIG. 8, a wireless LAN connection may be established between the digital camera 100 and the smartphone 200 by the user's manual operation.

Figure 9:
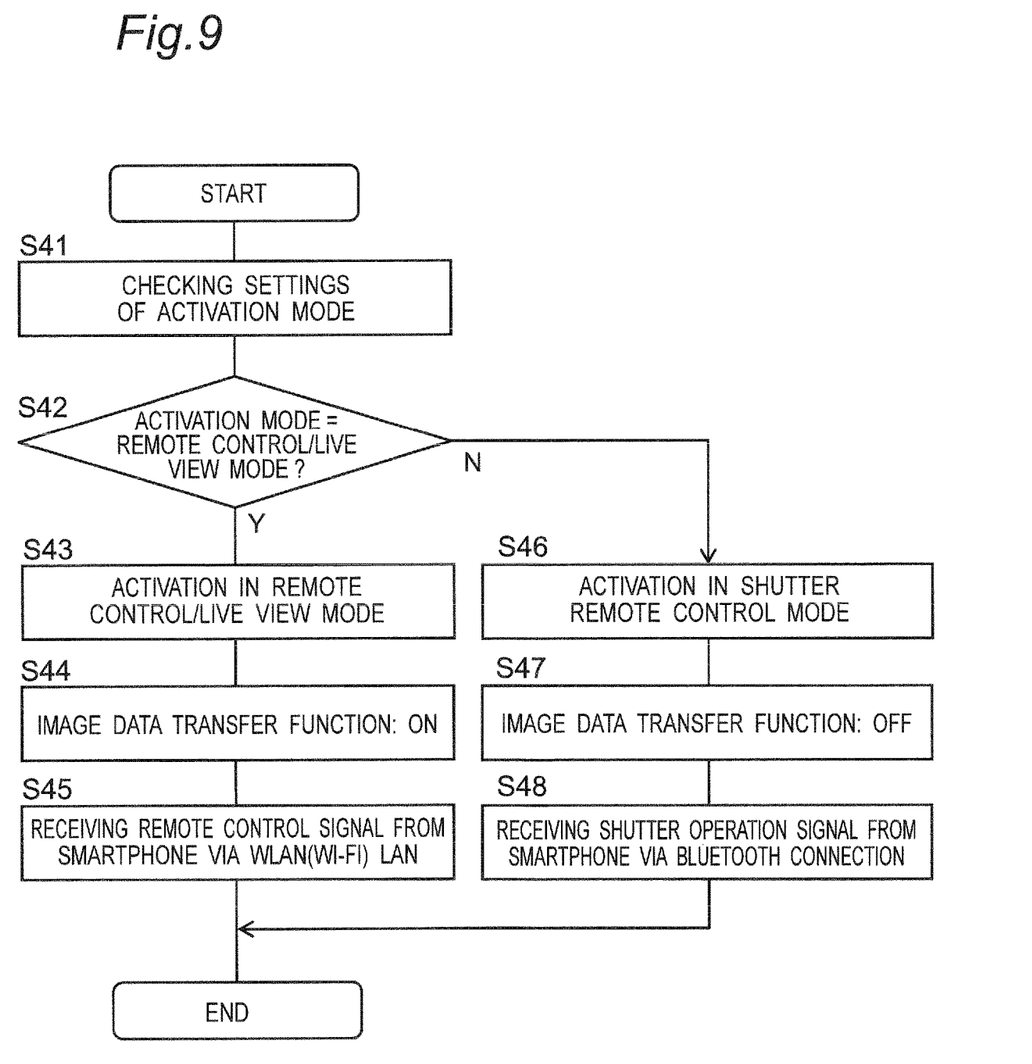
FIG. 9 is a flowchart showing processing during remote activation in the digital camera.

FIG. 9 is a flowchart showing processing during remote activation of the digital camera 100. The processing is performed by the controller 135 of the digital camera 100 when activated by receiving a remote request from the smartphone 200.

When activated by the Bluetooth module 160 in accordance with a remote request from the smartphone 200, the controller 135 checks settings of the activation mode (S41).

When the activation mode is set to the remote control/live view mode (YES in S42), the controller 135 activates in the remote control/live view mode (S43). That is, in accordance with the sequence shown in FIG. 6, a wireless LAN connection and a Bluetooth connection are established with the smartphone 200. At this point, the controller 135 turns on an image data transfer function (S44) to transfer the image data for live view display to the smartphone 200 via the wireless LAN. In addition, the controller 135 receives a remote control signal from the smartphone 200 via the wireless LAN (S45). The controller 135 performs control according to the remote control signal received from the smartphone 200.

On the other hand, when the activation mode is not set to the remote control/live view mode, that is, when the activation mode is set to the shutter remote control mode (NO in S42), the controller 135 activates in the shutter remote control mode (S46). That is, according to the sequence shown in FIG. 8, a Bluetooth connection is established with the smartphone 200. At this point, the controller 135 does not make an automatic wireless LAN connection with the smartphone 200. The controller 135 turns off the image data transfer function (S47) so that the image data for live view display is not transferred to the smartphone 200. In addition, the controller 135 receives a shutter operation signal from the smartphone 200 via Bluetooth (S48). Upon receiving the shutter operation signal from the smartphone 200, the controller 135 records the image data captured by the image sensor 115 in the memory card 142 at the receiving timing.

As described above, the digital camera 100 activates in the remote control/live view mode or the shutter remote control mode when remotely activated according to the settings. In particular, when activated in the remote control/live view mode, wireless LAN communication (Wi-Fi communication) is first established and then Bluetooth communication is established. Accordingly, wireless LAN communication can be promptly established and images are made quickly transferable. That is, it is possible to implement the live view function in the smartphone 200 in a short time after the remote activation of the digital camera 100. In the shutter remote control mode, Bluetooth communication is established without establishing wireless LAN communication (Wi-Fi communication). Accordingly, a remote shutter operation using Bluetooth communication can be made in a short time after the remote activation of the digital camera 100.

Even when the digital camera 100 is in the power-off state (sleep mode), the Bluetooth module 160 of the digital camera 100 can notify the smartphone 200 of the status according to the BLE standard. Information indicating the activation mode (the remote control/live view mode or the shutter remote control mode) set in the digital camera 100 is transmitted to the smartphone 200 as the notification of status. Based on the information received from the digital camera 100, the smartphone 200 determines the activation mode set in the digital camera 100 and operates in a sequence corresponding to the activation mode of the digital camera 100. That is, the smartphone 200 operates in one of the sequences shown in FIGS. 6 and 8 according to the activation mode of the digital camera 100. When the digital camera 100 supports none of the remote control/live view mode and the shutter remote control mode, the smartphone 200 may operate in the sequence shown in FIG. 7.

1-3. Effects, Etc.

As described above, the digital camera 100 (an example of the imaging apparatus) in the present embodiment is an imaging apparatus that can be remote-controlled from the smartphone 200 (an example of the external device). The digital camera 100 includes the Wi-Fi module 155 (an example of a first communicator) that performs Wi-Fi communication (an example of a first communication) with the smartphone 200, the Bluetooth module 160 (an example of a second communicator) that performs Bluetooth communication (an example of a second communication) with the smartphone 200, the operation unit 150 (an example of a setter) that sets at least the remote control/live view mode (an example of a first function) or the shutter remote control mode (an example of a second function) as a function executed when remotely activated from the smartphone 200, and the controller 135 (an example of a controller) that controls the operation of the digital camera 100 according to the set function.

The remote control/live view mode is a mode (function) in which image data is transmitted to the smartphone 200 via the Wi-Fi module 155 and an operation signal for remote control is received from the smartphone 200. The shutter remote control mode is a mode (function) in which an operation signal from the smartphone 200 is received via the Bluetooth module 160. When the remote control/live view mode is set, the controller 135 first establishes a connection (an example of a first connection) of Wi-Fi communication (S4 of FIG. 6) when remotely activated from the smartphone 200 and then establishes a connection (an example of a second connection) of Bluetooth communication (S7).

With the above configuration, wireless LAN communication can be promptly established and images can be transferred quickly. That is, it is possible to implement the live view function in the smartphone 200 in a short time after the remote activation of the digital camera 100.

When the shutter remote control mode is set, the controller 135 establishes a connection of Bluetooth communication without establishing a connection of Wi-Fi communication when remotely activated from the smartphone 200 (S24 in FIG. 8). Accordingly, the shutter remote control function can be implemented quickly.

Other Embodiments

As described above, the first embodiment has been described as an example of the technology disclosed in the present application. However, the technology in the present disclosure is not limited to this, and can also be applied to embodiments in which changes, substitutions, additions, omissions, or the like are made as appropriate. In addition, it is also possible to combine the respective components described in the above embodiment to form a new embodiment.

In the above embodiment, the digital camera 100 and the smartphone 200 are connected via two types of communication, Bluetooth communication and Wi-Fi communication, but communication between the digital camera 100 and the smartphone 200 is not limited to the above configuration. Communication conforming to other communication standards may also be used.

Although a digital camera has been described as an example of the imaging apparatus, the imaging apparatus is not limited thereto. An electronic device (for example, a video camera, a smartphone, a tablet terminal or the like) having an image photographing function and a communication function may be used as the imaging apparatus. Although a smartphone has been described as an example of an external device, the external device is not limited thereto. Any device (for example, a tablet terminal) capable of communicating with an imaging apparatus can be used as an external device.

The controller 135 of the digital camera 100 and the controller 225 of the smartphone 200 can be configured with a CPU, a GPU, an MPU, an FPGA, an ASIC or the like.

As described above, an embodiment has been described as an example of the technology in the present disclosure. To that end, the accompanying drawings and detailed description have been provided.

Therefore, among components described in the accompanying drawings and detailed description, not only essential components for solving the problem, but also components that are not essential for solving the problem are included to illustrate the technology. For this reason, the fact that these non-essential components are described in the accompanying drawings or detailed description should not immediately lead to the recognition that these non-essential components are essential.

Further, the above embodiment is provided to illustrate the technology in the present disclosure and thus, it is possible to make various changes, substitutions, additions, omissions, or the like within the scope of claims or equivalents thereof.

The present disclosure can be applied to an imaging apparatus that can be remote-controlled from an external device.

The present disclosure provides the imaging apparatus capable of communicating with an external device via a plurality of communication paths. According to the present disclosure, the imaging apparatus capable of quickly starting a desired function (first function) when remotely activated from an external device can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. An imaging apparatus comprising:
   a first communicator and a second communicator both configured to communicate with an external device, wherein the external device remote-controls the imaging apparatus;
   a setter configured to set at least a first function or a second function as a function to be executed when remotely activated by the external device, wherein:
      the first function transmits image data to the external device via a connection established with the external device via the first communicator, and receives an operation signal for remote control from the external device, and
      the second function receives the operation signal from the external device via a connection established with the external device via the second communicator; and
   a controller configured to
      control an operation of the imaging apparatus according to the function set, wherein
      when the imaging apparatus is in a state in which neither the connection with external device via the first communicator nor the connection with the external device via the second communicator is established, and the imaging apparatus is remotely activated by the external device when the first function is set, the controller initially establishes the connection with the external device via the first communicator, and
      after establishing the connection with the external device via the first communicator, the controller automatically establishes the connection with the external device via the second communicator.

2. The imaging apparatus according to claim 1, wherein when the imaging apparatus is in the state in which neither the connection with external device via the first communicator nor the connection with the external device via the second communicator is established, and the imaging apparatus is remotely activated from the external device when the second function is set, the controller establishes the connection with the external device via the second communicator without first establishing the connection with the external device via the first communicator.

3. The imaging apparatus according to claim 1, wherein the controller does not transfer the image data to the external device via the first communicator and receives an operation signal for shutter operation from the external device via the second communicator in the second function.

4. The imaging apparatus according to claim 1, wherein the external device executes a live view display function using the image data received when the external device receives the image data transmitted by the imaging apparatus using the first function.

5. The imaging apparatus according to claim 1, wherein the communication with the external device via the first communicator conforms to a Wi-Fi standard, and the communication with the external device via the second communicator conforms to a Bluetooth standard.

6. The imaging apparatus according to claim 2, wherein the communication with the external device via the first communicator conforms to a Wi-Fi standard, and the communication with the external device via the second communicator conforms to a Bluetooth standard.

7. The imaging apparatus according to claim 3, wherein the communication with the external device via the first communicator conforms to a Wi-Fi standard, and the communication with the external device via the second communicator conforms to a Bluetooth standard.

8. The imaging apparatus according to claim 4, wherein the communication with the external device via the first communicator conforms to a Wi-Fi standard, and the communication with the external device via the second communicator conforms to a Bluetooth standard.

* * * * *